ns in aque-
United States Patent [19]

Hoefer et al.

[11] Patent Number: 4,981,893
[45] Date of Patent: Jan. 1, 1991

[54] FOAM INHIBITORS FOR POLYMER DISPERSIONS

[75] Inventors: Rainer Hoefer, Duesseldorf; Karl-Heinz Schmid, Mettmann; Adolf Asbeck, Duesseldorf; Uwe Held, Velbert, all of Fed. Rep. of Germany

[73] Assignee: Henkel Kommanditgesellschaft auf Aktien, Duesseldorf, Fed. Rep. of Germany

[21] Appl. No.: 136,237

[22] Filed: Dec. 21, 1987

[30] Foreign Application Priority Data

Dec. 22, 1986 [DE] Fed. Rep. of Germany ....... 3643896

[51] Int. Cl.$^5$ ............................................. C08K 5/06
[52] U.S. Cl. ..................................... 524/369; 524/375; 524/755
[58] Field of Search ........................ 524/369, 375, 755

[56] References Cited

U.S. PATENT DOCUMENTS

| | | | |
|---|---|---|---|
| 3,463,737 | 8/1969 | Kasperl et al. | 252/153 |
| 3,491,029 | 1/1970 | Kasperl et al. | 252/156 |
| 3,696,057 | 10/1972 | Schussler et al. | 252/544 |
| 4,522,740 | 6/1985 | Schmid et al. | 252/174.21 |
| 4,548,729 | 10/1985 | Schmid et al. | 252/174.21 |

FOREIGN PATENT DOCUMENTS

| | | |
|---|---|---|
| 0213518 | 3/1987 | European Pat. Off. . |
| 1193412 | 6/1970 | United Kingdom . |
| 2158080 | 11/1985 | United Kingdom . |

Primary Examiner—Joseph L. Schofer
Assistant Examiner—J. M. Reddick
Attorney, Agent, or Firm—Ernest G. Szoke; Wayne C. Jaeschke; Real J. Grandmaison

[57] ABSTRACT

Compounds corresponding to the following formula

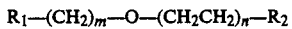

$$R_1-(CH_2)_m-O-(CH_2CH_2)_n-R_2$$

in which $R_1$ is the phenyl radical or a phenyl radical which is substituted by linear or branched alkyl radicals containing a total of from 1 to 18 carbon atoms, $R_2$ is a $C_4$–$C_8$ alkyl radical, $m=0$ or 1 and $n=3$ to 30, are used as dispersants with foam-inhibiting properties in aqueous polymer dispersions and latices.

24 Claims, No Drawings

FOAM INHIBITORS FOR POLYMER DISPERSIONS

BACKGROUND OF THE INVENTION

1. Field of the Invention

This invention relates to terminally blocked alkyl polyethylene glycol ethers in aqueous polymer dispersions and latices to provide them with certain advantageous properties.

2. Statement of Related Art

U.S. Pat. No. 4,548,729 relates to the use of polyethylene glycol ethers corresponding to the following formula $$R_1-O-(CH_2CH_2O)_n-R_2$$

in which $R_1$ is a linear or branched $C_8-C_{18}$ alkyl or alkenyl radical, $R_2$ is a $C_4-C_8$ alkyl radical and n is a number of from 7 to 12, as foam inhibiting additives for low-foam cleaning preparations. The field of application envisaged is, in particular, institutional and industrial cleaning preparations, for example for the cleaning of metal, glass, ceramic, and plastic surfaces. Compared with known foam-inhibiting additives based on adducts of alkylene oxides of inorganic compounds containing reactive hydrogen atoms in the molecule, of the type described for example in U.S. Pat. No. 3,491,029, German Patent No. 1,621,592, U.S. Pat. No. 3,463,737, German Pat. No. 1,621,593 and U.S. Pat. No. 3,696,057, the compounds corresponding to the above formula are distinguished by the fact that they are also biodegradable, their biological degradability as determined by the stipulated methods corresponding to a BiAS removal of more than 80%.

In addition, U.S. Pat. No. 4,548,729 describes the use of the polyethylene glycol ethers corresponding to the above formula in admixture with polyethylene glycol ethers obtained by addition of from 4 to 20 parts by weight of ethylene oxide onto 1 part by weight of polyglycerol having a hydroxyl value of from 900 to 1200 and subsequent etherification of the free hydroxyl groups with $C_4-C_8$ alkyl halides. The preparation of such polyglycerol/ethylene oxide ethers and their use are described in U.S. Pat. No. 4,522,740.

DESCRIPTION OF THE INVENTION

Other than in the operating examples, or where otherwise indicated, all numbers expressing quantities of ingredients or reaction conditions used herein are to be understood as modified in all instances by the term "about".

Against the above prior art which is concerned with cleaning preparations in the form of mixtures, an object of the present invention is to obtain improvements in aqueous polymer dispersions and latices. Aqueous polymer dispersions and corresponding latices obtained by emulsion polymerization are widely used in industry. For example, they are used as binder dispersions which are exposed to various forms of stressing during transport, storage and application. Polymer dispersions of the prior art type are, basically, highly sensitive unstable two-phase systems which are subjected to numerous destabilizing influences under the described in-use conditions. Their stabilization, i.e. in particular the prevention of unwanted creaming or coagulation, presents the polymer expert with a complex set of problems to which the most varied solutions have been proposed. Polymer dispersions and emulsions of the above type have to be protected, for example, against coagulation by freezing and thawing influences, additions of electrolytes or the shear forces and other forces occurring during formulation to dispersion dyes, coating compositions, dispersion plasters, leather finishes, polishes, adhesives, textile auxiliaries or other fields of application known to those skilled in the art. Nonionic surfactants, such as fatty alcohol, fatty acid, alkylphenol or fatty amine polyglycol ethers are normally used for these stabilizing functions, although they generally promote foaming in the system and, in many cases, do not show satisfactory biodegradability.

In general, there is an ongoing search, especially for application in emulsion polymerization, for new surface-active agents which exhibit favorable properties both during preparation of the emulsion and during polymerization, and particularly with respect to the properties of the polymer latex formed. The situation is made more acute by the fact that the expert is unable, on the basis of the chemical composition of a surface-active agent, to draw any conclusions as to its properties as a polymerization emulsifier or stabilizer.

In a first embodiment, the present invention relates to the use of compounds corresponding to the following general formula $$R_1-(CH_2)_m-O-(CH_2CH_2O)_n-R_2 \quad (I)$$

in which $R_1$ is a phenyl radical which can be substituted by one or more linear or branched $C_1-C_{18}$ alkyl radicals in which such radicals contain a total of from 1 to 30 carbon atoms, $R_2$ is a $C_4-C_8$ alkyl radical, $m=0$ or 1 and $n=3$ to 30, in aqueous polymer dispersions and latices as an emulsifying and/or emulsion-stabilizing, biologically degradable constituent with foam-inhibiting properties.

In formula (I) above, $R^1$ may be a phenyl radical or a monoalkylated or polyalkylated phenyl radical in which the alkyl radicals preferably contain from 3 to 18 carbon atoms. The sum of the carbon atoms in the alkyl radicals should preferably not exceed 24.

Accordingly, the radical $R_1-(CH_2)_m$ may have the following meaning: monoalkyl phenyl or monoalkyl benzyl, dialkyl phenyl or dialkyl benzyl, trialkyl phenyl or trialkyl benzyl, tetralkyl phenyl or tetralkyl benzyl, pentaalkyl phenyl or pentaalkyl benzyl with $C_1-C_{18}$ alkyl radicals containing a total of up to 30 carbon atoms. Preferred radicals are those in which $m=0$ and the sum of the carbon atoms in the alkyl radicals is from 8 to 24. The following radicals are given as examples: (a) tripropyl phenyl, (b) n-octyl phenyl, (c) isooctyl phenyl, (d) n-nonyl phenyl, (e) isononyl phenyl, (f) n-dodecyl phenyl, (g) isododecyl phenyl, (h) di-n-octyl phenyl, (i) diisooctyl phenyl, (k) di-n-nonyl phenyl, (l) diisononyl phenyl, (m) di-n-dodecyl phenyl, (n) diisododecyl phenyl.

Of the compounds mentioned above, those containing the substituents (c), (e) and (g) are particularly preferred.

According to the invention, the compounds corresponding to general formula I may actually be present during the emulsion polymerization, being used as emulsifiers or coemulsifiers, optionally in combination with other emulsifiers, for example anionic emulsifiers. Equally, however, it is possible subsequently to add the compounds corresponding to general formula I as an additional stabilizer to prepared polymer dispersions and latices. These measures may of course also be combined with one another.

Insofar as the preparation of the compounds of general formula I used in accordance with the invention is concerned reference is made to U.S. Pat. No. 4,548,729 discussed above for a general process that can be adapted for use in the preparation of the compounds of formula I. The alkylphenols or alkylated benzyl alcohols may be used individually or in admixture as starting material for the preparation of these polyglycol ethers. The reaction with ethylene oxide is carried out in a molar ratio of from 1:3 to 1:30. The hydroxyl groups present in the intermediate reaction product obtained are then etherified. The reaction with ethylene oxide takes place under the known alkoxylation conditions, preferably in the presence of suitable alkaline catalysts. The etherification of the free hydroxyl groups is preferably carried out under the known conditions of Williamson's ether synthesis with linear or branched $C_4$–$C_8$ alkyl halides, for example with n-butyl iodide, sec.-butyl bromide, tert.-butyl chloride, amyl chloride, tert.-amyl bromide, n-hexyl chloride, n-heptyl bromide and n-octyl chloride. The alkyl halide and alkali are best used in a stoichiometric excess, for example of 100 to 200%, over and above the hydroxyl groups to be etherified.

One particularly preferred embodiment of the invention is use of polyglycol ethers corresponding to formula I in which n is a number of from 5 to 20. Another particularly preferred embodiment is the use of compounds corresponding to formula I in which $R_2$ is the n-butyl radical and n=7 to 16.

In another embodiment of the invention, the polyglycol ethers corresponding to general formula I are used in combination with polyethylene glycol ethers of the type described in the abovecited U.S. Pat. No. 4,548,729, which is expressly incorporated herein by reference. These polyethylene glycol ethers are polyethylene glycol ether products obtained by addition of from 4 to 20 parts by weight ethylene oxide onto 1 part by weight polyglycerol having a hydroxyl value of from 900 to 1200 and subsequent etherification of the free hydroxyl groups with $C_4$–$C_8$ alkyl halides. The ratio by weight of the polyglycol ethers corresponding to general formula I to these terminally blocked polyglycerol polyglycol ethers can be from 1:1 to 9:1 and more especially from 2.5:1 to 9:1. These mixtures are also distinguished by a strong foaminhibiting effect and satisfy legal requirements in regard to biological degradability. The polyglycol ethers or polyglycol ether mixtures used in accordance with the invention are also distinguished by their stability to alkalis and acids.

In practice, the polymer dispersions and latices contain the compounds of general formula I or mixtures thereof with the polyglycerol ethers in quantities of from 0.05 to 5% by weight, based on the dry matter in the dispersion. Quantities of from about 0.5 to 3% by weight are particularly preferred.

The invention will be illustrated but not limited by the following examples.

EXAMPLES

Determination of foam properties, such as foam generation and foam collapse, by the free fall circulation method.

The test is carried out on prepared polymer dispersions.

Procedure 50 g of prepared dispersion are diluted with 450 g of fully deionized water and transferred to a 2 liter measuring cylinder provided with a heating jacket. The test is normally carried out at 25° C. Using a laboratory peristaltic pump (Heidolph type RG-L 85), the test dispersion is continuously circulated in a throughflow rate of 3 liters per minute. The solution is taken in under suction from the bottom of the measuring cylinder using a glass pipe and returned by free fall through a second glass pipe. The second glass pipe is installed in the test apparatus in such a way that it ends level with the 2000 ml mark of the measuring cylinder. After 10 minutes, the maximum foam volume (total volume) is read off and circulation completed. In general, volumes of from about 1600 to 2100 ml are established.

The total volume is read off at intervals of 0.5, 1, 2, 3, 5, 10 and 20 minutes and the values determined are recorded in a volume/time diagram. The values obtained provide an indication of the foaming properties of the polymer dispersion.

The described method may be used to test the effect of foaminhibiting substances or low-foam surfactants on their foam properties. In this case, the total volume of a polymer dispersion after circulation for 10 minutes and the foam collapse are determined at the same time intervals as before. The values obtained represent the standard for the further tests. For comparison, a test substance is carried with the substance to be tested. The test substance is added to the polymer dispersion before the 10-minute circulation period.

The quantities added range from 0.1 to 20% test substance, based on dispersion dry matter, depending on the type of substance.

The above procedure was used for the test results obtained in the following examples.

EXAMPLE 1

An isooctylphenol (7 EO)-n-butyl mixed ether (product A) was tested as a foam-inhibiting additive in a 50% terpolymer dispersion of the VAc/VeoVa/AS type. The 50% polymer dispersion contains 33.0 parts by weight (pbw) vinyl acetate, 14.4 pbw versatic acid vinyl ester (VeoVa 10) and 4.8 pbw acrylic acid and was prepared with a mixture of a lauryl ether sulfosuccinic acid semiester, disodium salt, and the condensation product of nonylphenol + 30 EO.

The described mixed ether was tested in comparison with a commercially available EO/PO block copolymer and the condensation product of nonylphenol + 10 EO by the test procedure described in the following. The described products were used with an addition of 2%, based on dispersion dry matter. For comparison, the polymer dispersion was tested without any additions as standard (blank test). The results obtained are shown in Table 1. The results clearly show that very good foam collapse properties compared with the blank test are obtained by addition of the described mixed ether of the invention. Compared with the prior art (EO/PO block polymer), a distinct improvement is obtained in foam inhibition. A nonylphenol + 10 EO used in practice to stabilize polymer dispersions actually produced increased foaming by comparison with the standard test.

TABLE I**

| Addition (type/quantity, based on dispersion dry matter) | Foam collapse in ml foam height after | | | | | |
|---|---|---|---|---|---|---|
| | 0 min. | 0.5 min. | 3 mins. | 5 mins. | 10 mins. | 20 mins. |
| No addition | 2000 | 2000 | 1800 | 1700 | 900 | 550 |
| Product A 2%* | 2000 | 1900 | 1600 | 1250 | 500 | 400 |
| Nonylphenol 10 EO 2% | 2000 | 2000 | 1850 | 1800 | 1100 | 600 |
| Commercial foam inhibitor 2% (EO/PO adduct) | 2000 | 2000 | 1800 | 1500 | 600 | 400 |

*based on dispersion dry matter
**the test results are only comparable with one another within the same series of tests.

EXAMPLE 2

The effect of different additions of product A against the standard (blank test) is demonstrated in Example 2 (Table II).

TABLE II**

| Addition (type/quantity, based on dispersion dry matter) | | Foam collapse in ml foam height after | | | | | |
|---|---|---|---|---|---|---|---|
| | | 0 min. | 0.5 min. | 3 mins. | 5 mins. | 10 mins. | 20 mins. |
| Product A | 0.2% | 2000 | 2000 | 1900 | 1800 | 1400 | 500 |
| Product A | 1.0% | 2000 | 1950 | 1800 | 1500 | 800 | 450 |
| Product A | 2.0% | 2000 | 1980 | 1700 | 1450 | 700 | 400 |
| Product A | 10.0% | 2000 | 1950 | 1600 | 1500 | 600 | 400 |
| No addition | — | 2000 | 2000 | 1950 | 1850 | 1680 | 1150 |

*based on dispersion dry matter
**the test results are only comparable with one another within one and the same series of tests.

EXAMPLE 3

| Product | Other products tested ($C_4$ signifies n-butyl ether) Chemical composition |
|---|---|
| B | isononylphenol + 7.5 EO-$C_4$ |
| C | isononylphenol + 8.0 EO-$C_4$ |
| D | isononylphenol + 9.0 EO-$C_4$ |
| E | isooctylphenol + 9.1 EO-$C_4$ |
| F | isononylphenol + 10.0 EO-$C_4$ |
| G | isododecylphenol + 16.0 EO-$C_4$ |

All the substances had an active substance content of approximately 100%.
The results are shown in Table III

TABLE III

| Addition (type/quantity, based on dispersion dry matter) | | Foam collapse in ml foam height after | | | | | |
|---|---|---|---|---|---|---|---|
| | | 0 min. | 0.5 min. | 3 mins. | 5 mins. | 10 mins. | 20 mins. |
| No addition | — | 2000 | 2000 | 1800 | 1700 | 900 | 550 |
| Products B-G | 2% | 2000 | 1900–2000 | 1600–1750 | 1350–1500 | 550–650 | 400–500 |
| Product A | 2% | 2000 | 1900 | 1700 | 1300 | 530 | 400 |

EXAMPLE 4

Use of an isononylphenol+10 EO-n-butyl mixed ether (product F) as a polymerization emulsifier
Test procedure:
For testing, 3 solutions were prepared for each test.
Solution 1:
1.3 g emulsifier X (100%)
0.5 g potassium peroxydisulfate
0.2 g borax
191.7 g fully deionized water Solution 2:
0.8 g emulsifier X (100%)
2.1 g borax
1.9 g potassium peroxydisulfate
12.0 g emulsifier Y (100%)
288.4 g fully deionized water
Solution 3:
330.1 g vinyl acetate
143.5 g versatic acid vinyl ester
4.8 g acrylic acid
23.9 g 10% ammonium carbonate solution

EXAMPLE 4.1 (Comparison Example)

A standard combination of anionic and nonionic emulsifiers was used. A 33.4% aqueous solution of a sodium fatty acid methyl ester sulfonate was used as anionic emulsifier X in solution 1 while a 70% nonylphenol +30 EO was used as nonionic emulsifier Y in solution 2 together with another 0.8 g active substance of the anionic emulsifier X.

EXAMPLE 4.2 (according to the invention)

Product F according to the invention was used instead of nonylphenol+30 EO as nonionic emulsifier Y in solution 2.
In all the tests, the total quantity was made up to 1000 g by adding or leaving out water.

Polymerization procedure

The components of solution 1 were introduced into the reaction vessel, purged with nitrogen and heated to 80° C. During the heating phase, a pre-emulsion was prepared in the receiving vessel by addition of monomer solution 3 to the emulsifier-containing aqueous phase, solution 2, with vigorous stirring. The pH value of the pre-emulsion was adjusted to 3.8–4.0. When the temperature inside the reactor reached 80° C., the addition of the monomer pre-emulsion was started and continued for 2 to 2.5 hours. On completion of the addition, the temperature of the reaction mixture was kept at 80° C. for another 2 hours. The dispersion was cooled and filtered and the pH value adjusted to 7.0–7.5 with 23.9 g of a 10% ammonium carbonate solution.

Result

Dispersions containing less than about 0.4% coagulate (based on dry matter) were obtained. The dispersions according to 4.2 were low-foam dispersions. Thus, the foam height of the dispersion in the described measuring arrangement was 1700 ml after 0.5 minutes, 800 ml after 5 minutes and only 480 ml after 10 minutes.

By contrast the foam height of the dispersion according to Comparison Example 4.1 was 1900 ml after 0.5 minutes, 1500 ml after 5 minutes and still 900 ml after 10 minutes.

What is claimed is:

1. A method of emulsifying or emulsionstabilizing an aqueous polymer dispersion comprising adding thereto or to the reaction mixture used in its preparation an compound of the formula $$R_1-(CH_2)_m-O-(CH_2CH_2O)_n-R_2 \qquad (I)$$

in which $R_1$ is a phenyl radical or a phenyl radical substituted by one or more linear or branched $C_1$–$C_{18}$ alkyl radical, $R_2$ is a $C_4$–$C_8$ alkyl radical, $m=0$ or 1, and $n=3$ to 30.

2. The method of claim 1 wherein in the compounds of formula I the total number of carbon atoms in the $C_1$–$C_{18}$ alkyl radicals is from 1 to 30.

3. The method of claim 2 wherein the total number of carbon atoms in the $C_1$–$C_{18}$ alkyl radicals is from 1 to 24.

4. The method of claim 2 wherein said $C_1$–$C_{18}$ alkyl radical contains from 3 to 18 carbon atoms.

5. The method of claim 3 wherein said $C_1$–$C_{18}$ alkyl radical contains from 3 to 18 carbon atoms and $m=0$.

6. The method of claim 1 wherein in the compounds of formula I $n=5$ to 20.

7. The method of claim 6 wherein $n=7$ to 16.

8. The method of claim 1 wherein in the compounds of formula I $R_2$ is the n-butyl radical.

9. The method of claim 6 wherein in the compounds of formula I $R_2$ is the n-butyl radical.

10. The method of claim 1 wherein the emulsifying or emulsion stabilizing quantity is from about 0.05 to about 5% by weight, based on the weight of the solids content of said dispersion.

11. The method of claim 10 wherein said quantity is from about 0.5 to about 3% by weight.

12. The method of claim 1 wherein said compound of formula I is present in admixture with at least one polyethylene glycol ether which is the reaction product of from about 4 to about 20 parts by weight of ethylene oxide and 1 part by weight of a polyglycerol having a hydroxyl value of from about 900 to about 1200 wherein the free hydroxyl groups are etherified with $C_4$–$C_8$ alkyl groups, and wherein the compounds of formula I are present in a ratio by weight to the polyethylene glycol ethers of from about 1:1 to about 9:1.

13. In an aqueous polymer dispersion, the improvement comprising the presence therein of an emulsifying or emulsion stabilizing quantity of at least one compound of the formula $$R_1-(CH_2)_m-O-(CH_2CH_2O)_n-R_2 \qquad (I)$$

in which $R_1$ is a phenyl radical or a phenyl radical substituted by one or more linear or branched $C_1$–$C_{18}$ alkyl radical, $R_2$ is a $C_4$–$C_8$ alkyl radical, $m=0$ or 1, and $n=3$ to 30.

14. The dispersion of claim 13 wherein in the compounds of formula I the total number carbon atoms in the $C_1$–$C_{18}$ alkyl radicals is from 1 to 30.

15. The dispersion of claim 14 wherein the total number of carbon atoms in the $C_1$–$C_{18}$ alkyl radicals is from 1 to 24.

16. The dispersion of claim 14 wherein said $C_1$–$C_{18}$ alkyl radical contains from 3 to 18 carbon atoms.

17. The dispersion of claim 15 wherein said $C_1$–$C_{18}$ alkyl radical contains from 3 to 18 carbon atoms and $m=0$.

18. The dispersion of claim 13 wherein in the compounds of formula I $n=5$ to 20.

19. The dispersion of claim 18 wherein $n=7$ to 16.

20. The dispersion of claim 13 wherein in the compounds of formula I $R_2$ is the n-butyl radical.

21. The dispersion of claim 18 wherein in the compounds of formula I $R_2$ is the n-butyl radical.

22. The dispersion of claim 13 wherein the emulsifying or emulsion stabilizing quantity is from about 0.05 to about 5% by weight, based on the weight of the solids content of said dispersion.

23. The dispersion of claim 22 wherein said quantity is from about 0.5 to about 3% by weight.

24. The dispersion of claim 13 wherein said compound of formula I is present in admixture with at least one polyethylene glycol ether which is the reaction product of from about 4 to about 20 parts by weight of ethylene oxide and 1 part by weight of a polyglyceol having a hydroxyl value of from about 900 to about 1200 wherein the free hydroxyl groups are etherified with $C_4$–$C_8$ alkyl groups, and wherein the compounds of formula I are present in a ratio by weight to the polyethylene glycol ethers of from about 1:1 to about 9:1.

* * * * *